Figure 1:
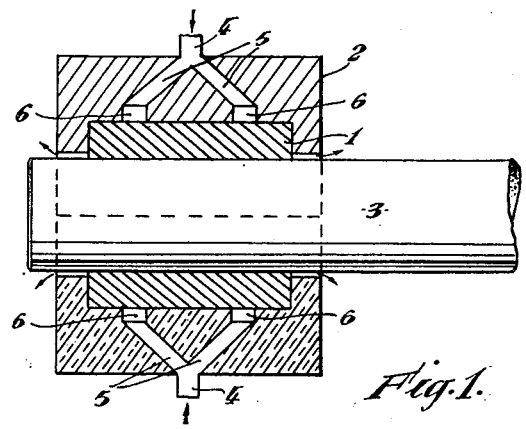

Dec. 21, 1954   D. C. MITCHELL   2,697,645
BEARING ASSEMBLY
Filed July 18, 1952

Inventor
David C. Mitchell
by Pierce, Scheffler & Parker
Attorneys

United States Patent Office 2,697,645
Patented Dec. 21, 1954

2,697,645

BEARING ASSEMBLY

David C. Mitchell, Isleworth, England, assignor to The Glacier Metal Company Limited, Wembley, England Application July 18, 1952, Serial No. 299,700

Claims priority, application Great Britain August 3, 1951

10 Claims. (Cl. 308—241)

This invention relates to bearing assemblies including bearing elements, such as plain bearing bushes, bearing liners, thrust washers or like anti-friction elements or components of ball, roller or like bearings having rolling contact between working surfaces.

The invention is concerned with bearing assemblies particularly adapted for operation at relatively high temperatures not normally exceeding about 550° C. but in which elevated running temperatures above 600° C. up to as high as 850° C. or more may occasionally arise.

It is well-known that molybdenum disulphide possesses the property in itself, or when applied as or incorporated into a surface layer, of providing a low coefficient of friction in sliding or rubbing contact with a wide range of materials with a minimum of surface damage, and up to relatively high temperatures. Thus, it is evident that plain bearings having a bearing surface or surface layer consisting of, or incorporating, molybdenum disulphide would be of particular utility for operation where normal lubrication methods cannot be used because of high temperature operating conditions.

Moreover, ball, roller or like bearings, when subject to operation under high temperature conditions, and particularly at high speeds as in gas turbines, are liable to deterioration because of difficulties arising from surface oxidation or other corrosive attack of the steel surfaces, and also because of the difficulty of maintaining effective lubrication under high temperature conditions. It has been found that these difficulties may be obviated by providing the balls, rollers or the like and/or races with a working surface of, or embodying, molybdenum disulphide.

In operation, however, the coating of molybdenum disulphide eventually will be worn away, particularly at high speeds, to expose the molybdenum metal beneath, and as a result, locally elevated temperature will occur involving the possibility of damage in the absence of the lubricating film of molybdenum disulphide.

The invention has for its object to provide an improved bearing assembly wherein a film of molybdenum disulphide may be maintained at the working surface or surfaces.

According to the present invention, a bearing assembly comprises a housing and bearing means in said housing, at least a substantial proportion of the bearing surface of said bearing means being initially molybdenum which has been treated by sulphiding to convert molybdenum exposed at the bearing surface to form a protective film of molybdenum disulphide, and said housing being adapted for the introduction in contact with the bearing surface of a gas mixture containing a sulphiding gas so that as the initial molybdenum disulphide coating is worn away and locally elevated temperatures above 600° C. arise, the sulphiding gas reacts with exposed molybdenum to renew the molybdenum disulphide coating.

At temperatures below 600° C. a sulphiding gas, such as hydrogen sulphide, will not react with molybdenum to any appreciable extent and thus, at working temperatures up to about 550° C., the sulphiding gas introduced in contact with the bearing surface will have substantially no effect. When, however, the initial molybdenum disulphide coating becomes worn away, for instance, at a high speed, to expose the molybdenum metal, and this exposed metal comes into rubbing contact with another metal or metal oxide, a locally elevated temperature as high as the melting point of the lowest melting point constituent of the rubbing surfaces may arise, and generally will rise to above 1000° C. As, however, the sulphiding gas will react with the molybdenum to form molybdenum disulphide quite rapidly when the temperature rises above 600° C., the molybdenum disulphide coating will be renewed before excessive locally elevated temperatures occur. At temperatures above 600° C., the sulphiding action is rapid, so that, if the temperature were maintained, there would be danger of excessive wear by the continuous formation and rubbing-off of molybdenum disulphide, and the invention therefore is restricted to bearing assemblies which normally operate at temperatures not exceeding about 550° C.

As a further precaution against excessive attack on the molybdenum metal, the sulphiding gas, such as hydrogen sulphide, preferably is applied in suitable proportion in an inert carrier gas, such as nitrogen.

The bearing means may be made of solid molybdenum or may comprise at least a bearing surface layer of solid molybdenum.

In the application of the invention to a plain bearing, the bearing means may comprise a sleeve of porous molybdenum and the bearing housing may be adapted for the supply of gas mixture to pass through the pores of the sleeve to the bearing surface.

In a modification, the bearing means may comprise a porous metal structure having a melting point above 850° C. and having molybdenum incorporated in the pores thereof, at least at the bearing surface. The porous metal structure incorporating molybdenum may be made by sintering compacts of mixed powders of the high melting point metal and molybdenum.

Bearing means comprising rolling contact elements may be made of solid molybdenum, or of a high melting point metal, such as nickel, coated with molybdenum.

A bearing assembly wherein the bearing means includes rolling contact elements may comprise a housing adapted to form a sealed enclosure for the bearing means and provided with means for the circulation of the gas mixture in contact with the bearing means. The housing may include a gland surrounding a rotatable element supported by the bearing, the gland having annular grooves, at least one of which adjacent the bearing means communicates with an outlet for the gas mixture, while at least one groove further from the bearing means communicates with an inlet for an inert gas forming a seal for preventing escape of gas mixture containing the sulphiding gas.

The invention is also applicable to gas or oil lubricated bearings, such as used with gyroscopes and other high-speed journals where there is the danger of metal contact during the starting up and stopping periods, the sulphiding gas or else a sulphiding liquid or suspended solid being added to the lubricating oil, being added in suitable proportion to the lubricant gas either during such period or continuously so that by reaction of the sulphiding gas with exposed molybdenum at locally elevated temperatures above 600° C. created by metal-to-metal contact, the film of molybdenum disulphide will be renewed.

Figure 2:
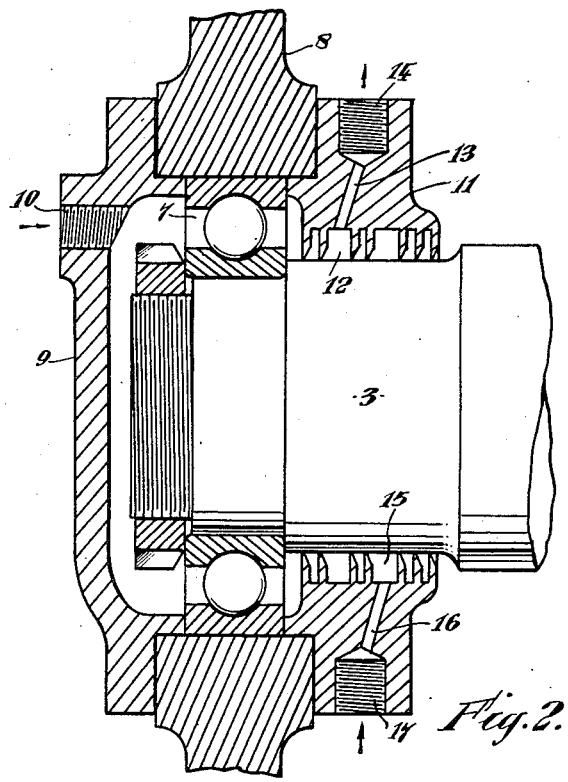

The invention is hereinafter described, by way of example, with reference to the accompanying diagrammatic drawing, in which:

Fig. 1 is a sectional elevation illustrating a construction of plain bearing assembly according to the invention; and Fig. 2 is a similar view illustrating the application of the invention to a ball bearing assembly.

In carrying the invention into effect according to one embodiment and with reference to Fig. 1 of the accompanying diagrammatic drawing, a plain bearing assembly comprises a sleeve 1 of porous molybdenum made by sintering molybdenum powder under suitable conditions, the sleeve being contained in a housing 2 comprising upper and lower parts which embrace the ends of the sleeve and extend close to the journal 3 with suitable clearance. Each part of the housing 2 is provided with an inlet 4 for the introduction of a gas mixture containing a sulphiding gas, the inlet 4 communicating through passages 5 with circumferentially extending grooves 6 so that the gas mixture introduced can percolate through the pores of the sleeve 1 substantially uniformly to the bearing surface and then escape through the clearance space at the ends between the housing and the journal.

The sleeve 1 of porous molybdenum prior to assembly in the housing is sulphided to form a coating of molybdenum disulphide over the bearing surface and, to a lesser extent, within the pores of the sleeve. For this purpose the sleeve is placed in a gas-tight container in a furnace, and the container is flushed with nitrogen for about 30 minutes to remove air. The sleeve is then heated to a temperature of about 800° C. and the nitrogen in the gas-tight container is replaced by dry hydrogen sulphide gas which is circulated for about 10 minutes with a gas flow of about 500 cc./min. for each square inch of molybdenum surface to be sulphided. Gas flow of hydrogen sulphide is then reduced to about 30 cc./min. per square inch of surface to be treated, and maintained for another 20 minutes. The gas-tight container is then flushed with nitrogen and allowed to cool to room temperature.

In operation, a gas mixture containing a sulphiding gas is continuously supplied to the inlets 4. At operating temperatures up to about 600° C. the sulphiding gas does not react to any appreciable extent with molybdenum, but as the initial sulphide coating wears away, the resulting metal-to-metal contact will cause locally elevated temperatures in excess of 600° C., and at these elevated temperatures the sulphiding gas will react with exposed molybdenum for the rapid removal of the molybdenum disulphide coating. In order to prevent excessive attack on the molybdenum the hydrogen sulphide should be suitably diluted in a carrier gas, for instance, an inert gas such as nitrogen. A gas mixture containing from 10% to 50% of hydrogen sulphide in nitrogen at a pressure of 2 to 4 atmospheres with a gas flow of 50 to 500 cc./min. is suitable for most applications.

A plain bearing such as described above may be employed with advantage in gas-lubricated bearings, such as used for gyroscopes and other high-speed journals, in which case the treating gas may be inert gas containing a suitable percentage of sulphiding gas.

In the application of the invention to a bearing assembly in which the bearing means includes rolling contact elements, the bearing means, such as a ball bearing unit 7 may, as shown in Fig. 2, be mounted in a housing 8 provided at one end with an end cap or closure 9 having an inlet 10 for the introduction of a gas mixture containing a sulphiding gas. At the opposite end of the bearing a gland 11 surrounds the journal 3 to complete a sealed enclosure of the unit 7, the part of the gland 11 surrounding the journal 3 having annular grooves, at least one annular groove 12 adjacent the bearing unit 7 communicating through a passage 13 with an outlet 14 for the gas mixture, while at least another annular groove 15 further from the bearing unit 7 communicates through a passage 16 with an inlet 17 for the introduction of an inert gas for sealing the gland 11 against escape of the gas mixture.

The elements of the ball bearing unit 7 are made of molybdenum or of suitable metal, such as nickel, provided with a surface coating of molybdenum, and the ball bearing unit 7, before assembly in the housing, is subjected to a sulphiding treatment for the formation of a coating of molybdenum disulphide on the bearing surfaces. As this molybdenum disulphide coating becomes worn away in use, and locally elevated temperatures above 600° C. arise, the sulphiding gas will react with the exposed molybdenum for renewal of the molybdenum disulphide coating.

It will be understood that the invention is not limited to the particular embodiments hereinbefore described. For example, the bearing assemblies may be otherwise suitably constructed for enclosing, or substantially enclosing, bearing means of, or comprising, molybdenum, having a bearing surface or surfaces initially sulphided, and for the introduction of a gas mixture containing a sulphiding gas so as to pass in contact with the bearing surface.

I claim:
1. A bearing assembly comprising bearing means having a molybdenum-containing bearing surface with a protective film of molybdenum sulfide thereon, a housing enclosing said bearing means, inlet and outlet passages in said housing communicating with said bearing surface and means for circulating a sulfiding gas through said passages and in contact with said bearing surface.
2. A bearing assembly according to claim 1, wherein the bearing means is made of solid molybdenum.
3. A bearing assembly according to claim 1, wherein the bearing means comprises at least a bearing surface layer of solid molybdenum.
4. A bearing assembly according to claim 1, wherein the bearing means comprises a sleeve of porous molybdenum and wherein said passages communicate with said bearing surface through the pores of said sleeve.
5. A bearing assembly according to claim 1, wherein the bearing means comprises a porous metal structure having a melting point above 850° C. and having molybdenum incorporated in the pores thereof, at least at the bearing surface.
6. A bearing assembly according to claim 1, wherein the bearing means comprises rolling contact elements made of solid molybdenum.
7. A bearing assembly according to claim 1, wherein the bearing means comprises rolling contact elements made of a high melting point metal coated with molybdenum.
8. A bearing assembly according to claim 1, wherein the bearing means includes rolling contact elements, and in which the housing forms a sealed enclosure for the bearing means.
9. A bearing assembly according to claim 8, wherein the housing includes a gland surrounding a rotatable element supported by the bearing, the gland having annular grooves, at least one of which adjacent the bearing means communicates with an outlet for the sulfiding gas, while at least one groove further from the bearing means communicates with an inlet for an inert gas forming a seal for preventing escape of sulfiding gas.
10. The combination of a rolling contact bearing assembly comprising rolling contact bearing elements operating between opposed race elements, said bearing elements and race elements being made of molybdenum and sulphided so that an adherent coating of molybdenum disulphide is produced on the working surfaces thereof, and means for maintaining a sulphiding agent in contact with said working surfaces for renewing the sulphide film during operation of the bearing at elevated temperatures.

References Cited in the file of this patent
UNITED STATES PATENTS

| Number | Name | Date |
|---|---|---|
| 2,223,872 | McWhorter et al. | Dec. 3, 1940 |
| 2,266,380 | Neely et al. | Dec. 16, 1941 |
| 2,335,225 | Atlee | Nov. 30, 1943 |
| 2,344,552 | Knochel et al. | Mar. 21, 1944 |
| 2,591,777 | Bowen | Apr. 8, 1952 |
| 2,622,993 | McCullough | Dec. 23, 1952 |

FOREIGN PATENTS

| Number | Country | Date |
|---|---|---|
| 555,519 | Great Britain | Aug. 26, 1943 |